(12) United States Patent
Yang et al.

(10) Patent No.: US 8,994,903 B2
(45) Date of Patent: Mar. 31, 2015

(54) LIQUID CRYSTAL DISPLAY

(75) Inventors: Seung-Suk Yang, Asan-si (KR); Ho-Jun Lee, Anyang-si (KR); Sang Ho Kim, Cheonan-si (KR); Sang Yeoul Lim, Suwon-si (KR); Young-Min Jung, Asan-si (KR); Ho Kyung Kim, Gwangju (KR); Sung Hoon Kim, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 264 days.

(21) Appl. No.: 13/483,909

(22) Filed: May 30, 2012

(65) Prior Publication Data

US 2013/0201431 A1   Aug. 8, 2013

(30) Foreign Application Priority Data

Feb. 7, 2012   (KR) .................. 10-2012-0012567

(51) Int. Cl.
- *G02F 1/1337* (2006.01)
- *G02F 1/1333* (2006.01)
- *G02F 1/1335* (2006.01)

(52) U.S. Cl.
CPC .... *G02F 1/133371* (2013.01); *G02F 1/133514* (2013.01); *G02F 1/133707* (2013.01)
USPC ............ 349/123; 349/113; 349/114; 349/129

(58) Field of Classification Search
USPC .................................. 349/123, 129, 113, 114
See application file for complete search history.

(56) References Cited

U.S. PATENT DOCUMENTS

| | | | |
|---|---|---|---|
| 6,504,592 B1 * | 1/2003 | Takatori et al. | 349/129 |
| 7,057,698 B2 | 6/2006 | Chung et al. | |
| 7,554,640 B2 | 6/2009 | Ono | |
| 2002/0015126 A1 * | 2/2002 | Tsuda et al. | 349/129 |
| 2004/0105062 A1 | 6/2004 | Lai et al. | |
| 2004/0263748 A1 | 12/2004 | Park et al. | |
| 2005/0030459 A1 * | 2/2005 | Song et al. | 349/129 |

FOREIGN PATENT DOCUMENTS

| | | |
|---|---|---|
| JP | 2002-055347 | 2/2002 |
| JP | 3926056 | 3/2007 |

(Continued)

OTHER PUBLICATIONS

English Abstract for Publication No. 2002-055347.

(Continued)

*Primary Examiner* — Lucy Chien
(74) *Attorney, Agent, or Firm* — F. Chau & Associates, LLC

(57) ABSTRACT

A liquid crystal display includes a display panel having a plurality of pixels. The display panel includes a first substrate and a second substrate opposing each other. A liquid crystal layer is positioned between the first substrate and the second substrate. A pixel electrode is positioned on the first substrate and positioned in one pixel of the plurality of pixels. An opposing electrode faces the pixel electrode with the liquid crystal layer interposed therebetween. At least one of the pixel electrode and the opposing electrode includes a liquid crystal inclination direction determining member. A transmission region of the pixel includes a first region and a second region that have different cell gaps of the liquid crystal layer from each other and extension directions of the liquid crystal inclination direction determining member in the first region and the second region are different from each other.

21 Claims, 8 Drawing Sheets

(56) References Cited

FOREIGN PATENT DOCUMENTS

| KR | 10-2005-0068880 | 7/2005 |
| KR | 10-2006-0101959 | 9/2006 |
| KR | 10-0885014 | 2/2009 |
| KR | 10-0924747 | 10/2009 |
| KR | 10-1050300 | 7/2011 |

OTHER PUBLICATIONS

English Abstract for Publication No. 10-2006-0101959.
English Abstract for Publication No. 3926056.
English Abstract for Publication No. 10-0885014.
English Abstract for Publication No. 10-0924747.
English Abstract for Publication No. 10-1050300.
English Abstract for Publication No. 10-2005-0068880.

* cited by examiner

LIQUID CRYSTAL DISPLAY

CROSS-REFERENCE TO RELATED APPLICATION

This application claims priority to Korean Patent Application No. 10-2012-0012567 filed in the Korean Intellectual Property Office on Feb. 7, 2012, the entire contents of which are incorporated herein by reference.

TECHNICAL FIELD

The present invention relates to a liquid crystal display.

DISCUSSION OF THE RELATED ART

A liquid crystal display (LCD) is a widely used flat panel display. The LCD includes two display panels provided with field generating electrodes such as pixel electrodes and a common electrode, and a liquid crystal (LC) layer interposed therebetween. The LCD displays images by applying voltages to the field-generating electrodes to generate an electric field in the LC layer that determines the orientation of LC molecules therein to adjust polarization of incident light.

One form of LCD is a vertical alignment (VA) mode LCD, which aligns LC molecules such that their long axes are perpendicular to the panels in the absence of an electric field. The VA mode LCD may have a high contrast ratio and a wide reference viewing angle. In the vertical alignment (VA) mode liquid crystal display, a plurality of domains where alignment directions of the liquid crystal are different may be formed in one pixel.

In forming an LCD, a liquid crystal inclination direction determining member may be formed such as by cutouts of a slit or protrusions in the field generating electrodes. In this method, the plurality of domains in one pixel may be formed by aligning the liquid crystal molecules vertically with respect to a fringe field generated between the edges of the liquid crystal inclination direction determining member and the field generating electrodes facing the edges.

For color liquid crystal displays, each pixel uniquely displays one of three primary colors or each pixel PX alternately displays three primary colors as time passes, and accordingly a desired color is recognized by a spatial or temporal sum of the primary colors. When each pixel uniquely displays one of the primary colors, each pixel may include a color filter representing one of the primary colors in a region corresponding to the pixel electrode. As the color filters have a particular thickness, a step difference may be generated in the display panel and the cell gap of the liquid crystal layer may have a deviation according to whether the color filter is presented or not.

In this way, when a step difference is generated in the display panel or the cell gap of the liquid crystal layer has a deviation, an arrangement of the liquid crystal molecules may be disturbed in a boundary of the step difference or cell gaps of the two different sizes, and thereby a stain such as texture may be generated and transmittance may be deteriorated.

SUMMARY

Exemplary embodiments of the present invention relate to an LCD with increased transmittance and reduced texture.

A liquid crystal display according to an exemplary embodiment of the present invention includes a display panel including a plurality of pixels. The display panel includes a first substrate and a second substrate opposing each other. A liquid crystal layer is positioned between the first substrate and the second substrate. A pixel electrode is positioned on the first substrate and is positioned in one pixel of the plurality of pixels. An opposing electrode faces the pixel electrode with the liquid crystal layer interposed therebetween. At least one of the pixel electrode and the opposing electrode includes a liquid crystal inclination direction determining member. A transmission region of the pixel includes a first region and a second region that have different cell gaps of the liquid crystal layer from each other. Extension directions of the liquid crystal inclination direction determining member in the first region and the second region are different from each other.

The cell gap of the liquid crystal layer of the first region may be larger than the cell gap of the liquid crystal layer of the second region, and a width of the liquid crystal inclination direction determining member in the first region may be larger than a width of the liquid crystal inclination direction determining member in the second region.

The liquid crystal display may further include a gate line positioned on the first substrate and the liquid crystal inclination direction determining member may include an oblique portion forming an oblique angle with the gate line.

The liquid crystal inclination direction determining member may be substantially symmetric with respect to a boundary between the first region and the second region.

The liquid crystal inclination direction determining member may further include a bar portion extending along a boundary between the first region and the second region.

The liquid crystal inclination direction determining member may include a cutout.

An engraved notch and an embossed notch may be alternately disposed in an oblique portion of the cutout.

A notch neighboring the bar portion may be an engraved notch.

The liquid crystal display may further include a color filter positioned in the second region and the color filter may be omitted from the first region.

According to an exemplary embodiment of the present invention, although a step difference in the display panel exists or deviation of the cell gap of the liquid crystal layer is generated in the transmission region of one pixel of the liquid crystal display, texture may be reduced such that the transmittance and luminance of the liquid crystal display may be increased.

A liquid crystal display panel includes a first substrate including a pixel electrode. A second substrate includes an opposing electrode. A plurality of pixels is formed in the pixel electrode. A liquid crystal layer is positioned between the pixel electrode and the opposing electrode. A liquid crystal inclination direction determining member is positioned on either the first or second substrate. A transmission region of each of the plurality of pixels includes a first region with a first cell gap and a second region with a second cell gap. The first and second cell gaps have different sizes. Extension directions of the liquid crystal inclination direction determining member in the first region and the second region are different from each other.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
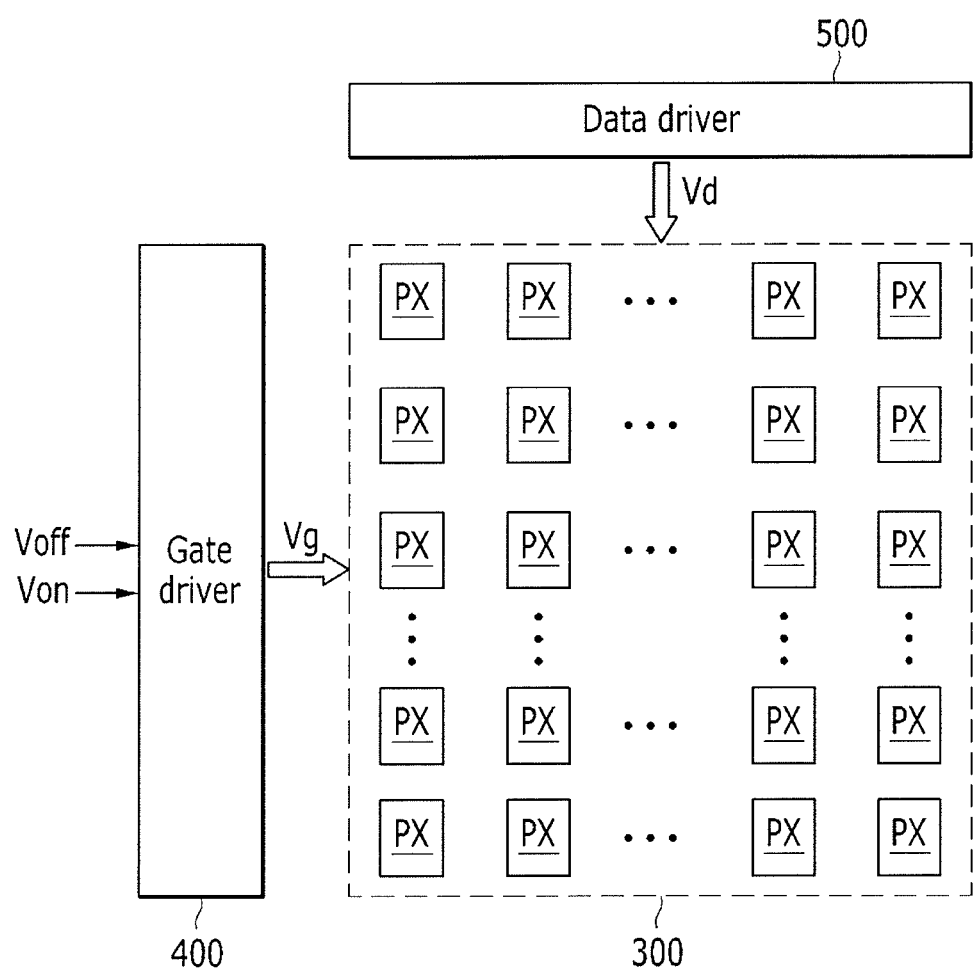
FIG. 1 is a block diagram of a liquid crystal display according to an exemplary embodiment of the present invention.

Exemplary embodiments of the present invention will be described more fully hereinafter with reference to the accompanying drawings. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present.

Firstly, a liquid crystal display according to an exemplary embodiment of the present invention will be described with reference to FIG. 1.

FIG. 1 is a block diagram of a liquid crystal display according to an exemplary embodiment of the present invention.

Referring to FIG. 1, a liquid crystal display according to an exemplary embodiment of the present invention includes a display panel 300, a gate driver 400, and a data driver 500.

The display panel 300 includes a plurality of signal lines (not shown) and a plurality of pixels PX connected thereto and arranged in an approximate matrix.

The signal lines may include gate lines transmitting a gate signal Vg and data lines transmitting a data voltage Vd.

Each pixel PX may include a switching element such as thin film transistor connected to the gate line and the data line, and a liquid crystal capacitor connected to the switching element. The liquid crystal capacitor may include a pixel electrode applied with the data voltage Vd from the switching element and an opposing electrode applied with a common voltage Vcom as two terminals.

For color displays, each pixel PX may uniquely display one of three primary colors in a manner which is called spatial division or each of the pixels may alternately display one of the primary colors at a time in a manner which is called temporal division. A desired color can be recognized by a spatial or temporal sum of the primary colors. An example of the primary colors that may be used is three primary colors including red, green, and blue. As one example of the spatial division, each pixel PX may include a color filter (not shown) representing one of the primary colors.

The data driver 500 is connected to the data lines of the display panel 300 and applies the data voltage Vd to the data line.

The gate driver 400 is connected to a gate line of the display panel 300, and applies the gate signal Vg configured by a combination of a gate-on voltage Von turning on the switching element and a gate-off voltage Voff turning off the switching element to the gate line.

Next, a detailed structure of a liquid crystal display according to an exemplary embodiment of the present invention will be described with reference to FIG. 2, FIG. 3, FIG. 4, and FIG. 5.

Figure 2:
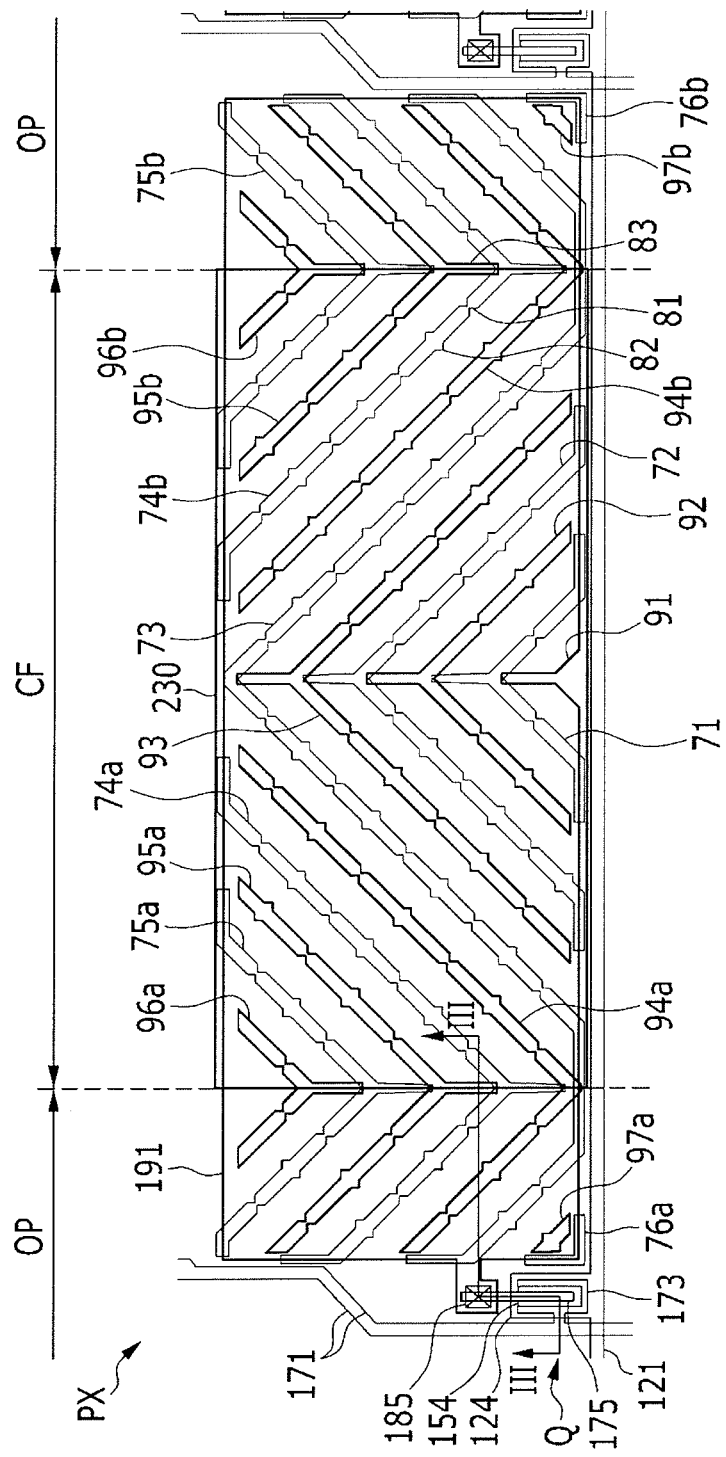
FIG. 2 is a layout view of one pixel of a liquid crystal display according to an exemplary embodiment of the present invention.
Figure 3:
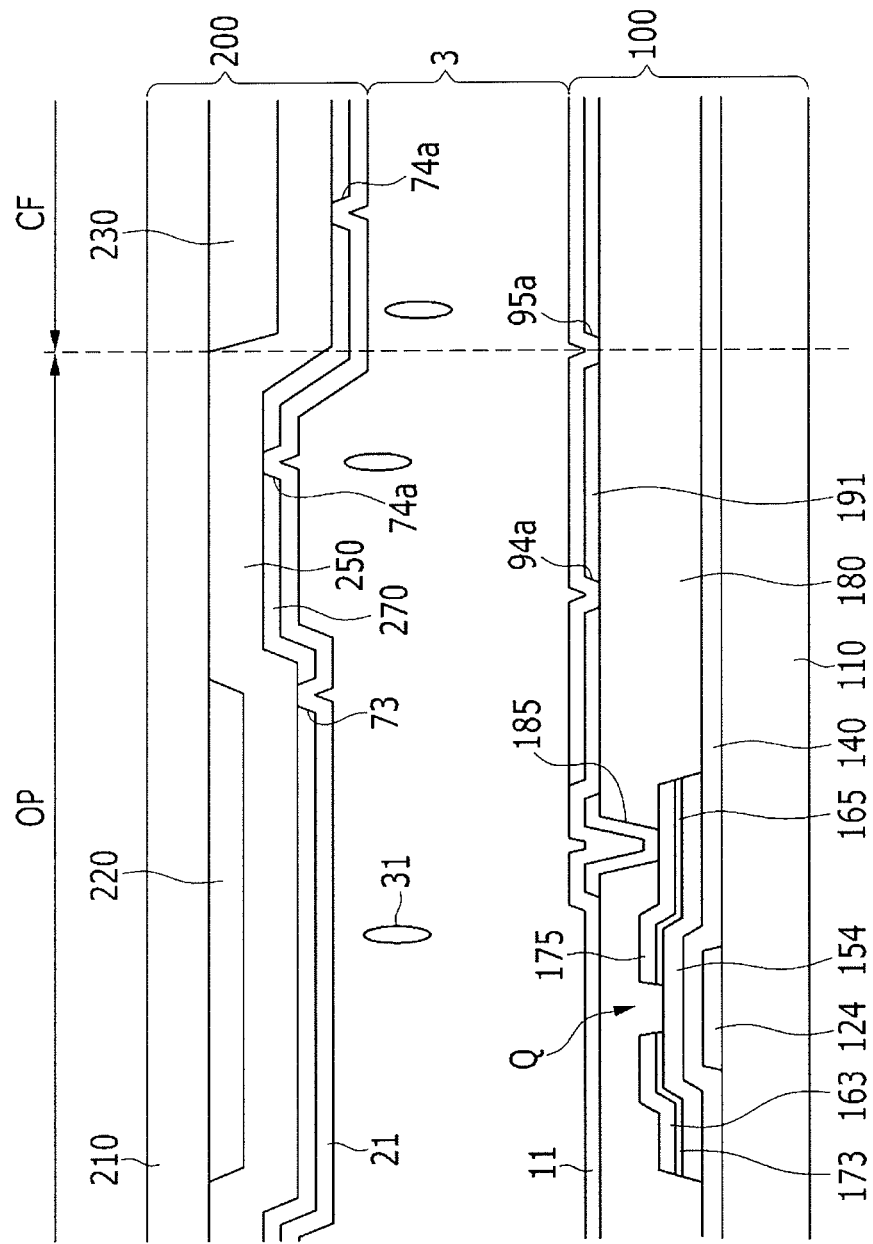
FIG. 3 is one example of a cross-sectional view of the liquid crystal display of FIG. 2 taken along the line III-III.
Figure 4:
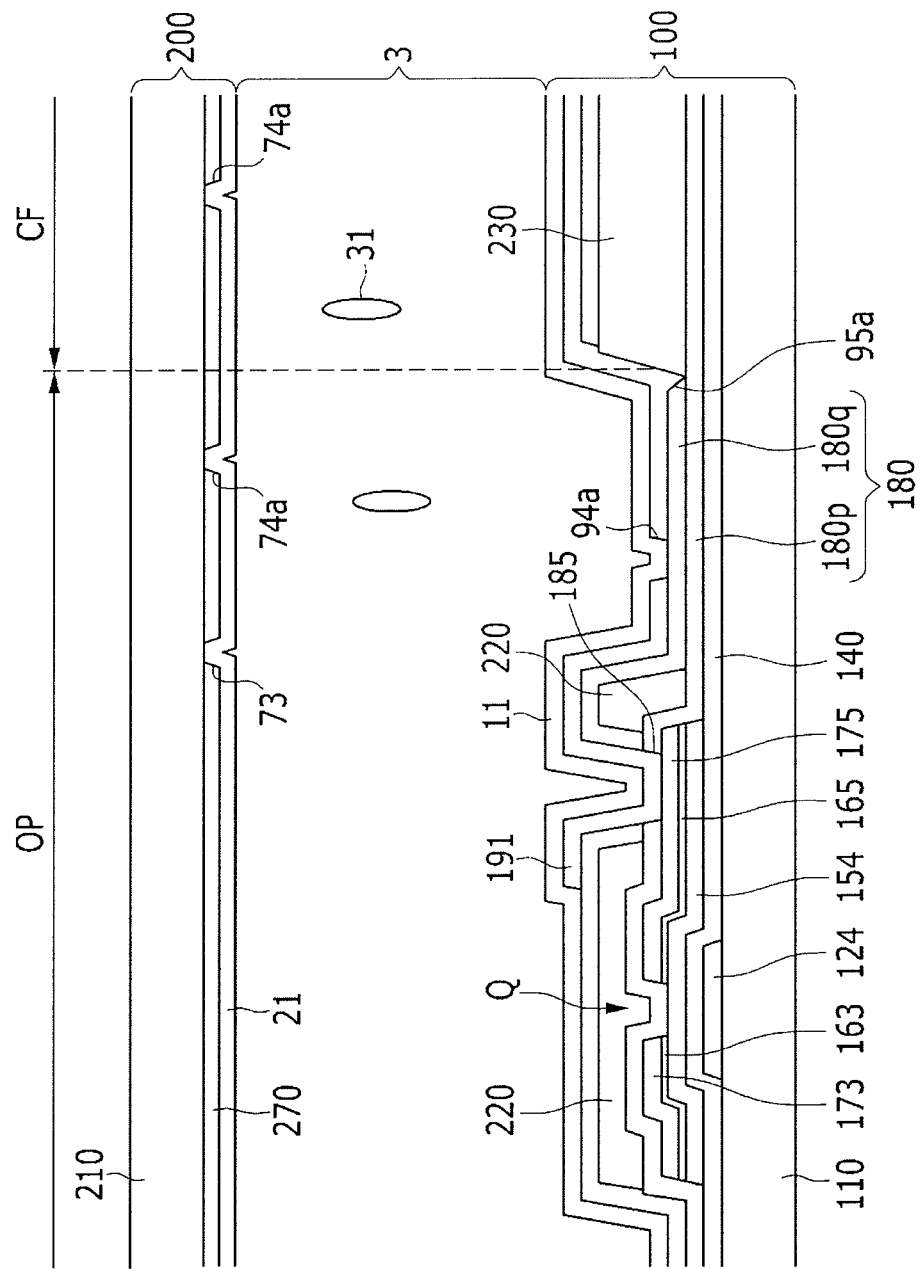
FIG. 4 is one example of a cross-sectional view of the liquid crystal display of FIG. 2 taken along the line III-III.
Figure 5:
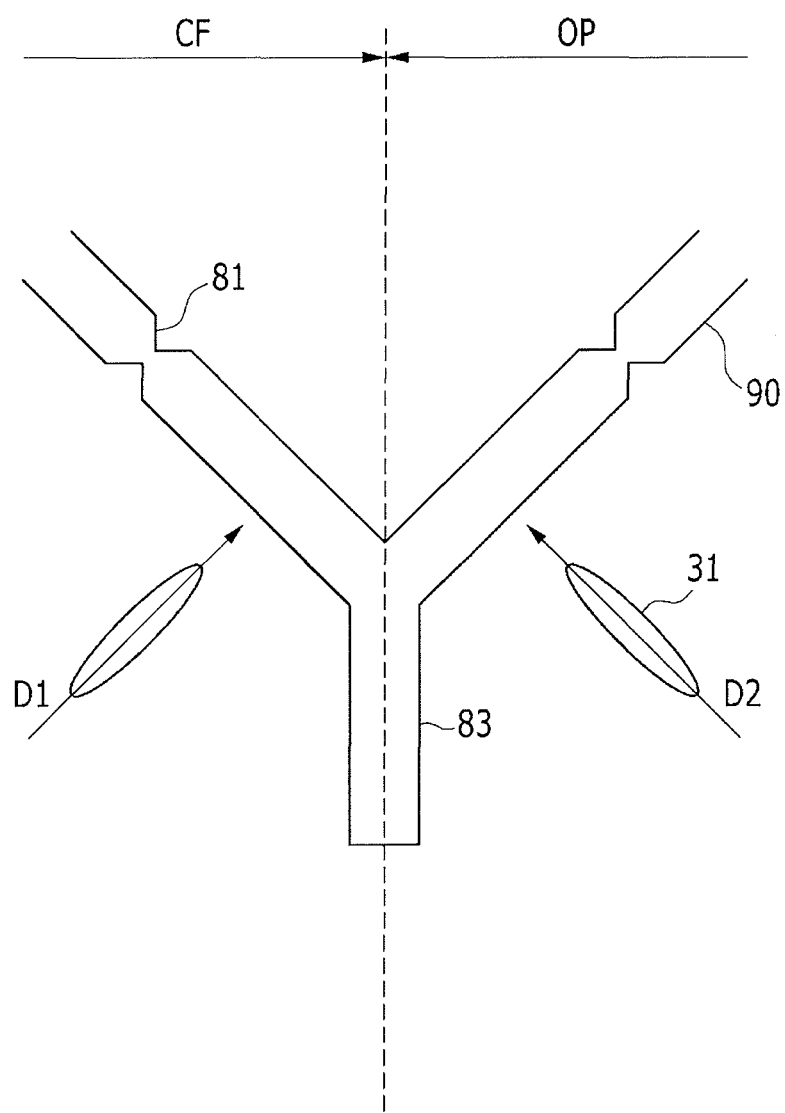
FIG. 5 is an enlarged view of a portion of one pixel of a liquid crystal display according to an exemplary embodiment of the present invention.

FIG. 2 is a layout view of one pixel of a liquid crystal display according to an exemplary embodiment of the present invention, FIG. 3 is one example of a cross-sectional view of the liquid crystal display of FIG. 2 taken along the line III-III, FIG. 4 is one example of a cross-sectional view of the liquid crystal display of FIG. 2 taken along the line III-III, and FIG. 5 is an enlarged view of a portion of one pixel of a liquid crystal display according to an exemplary embodiment of the present invention.

The liquid crystal display according to an exemplary embodiment of the present invention includes a lower panel 100 and an upper panel 200, and a liquid crystal layer 3 interposed between two display panels 100 and 200.

Firstly, referring to FIG. 2 and FIG. 3, the upper panel 200 will be described.

The upper panel 200 includes a light blocking member 220 and a color filter 230 are formed on an insulation substrate 210.

The light blocking member 220 may include an opened area defining a transmission area of each pixel PX.

Most of the color filter 230 may be formed in the area enclosed by the light blocking member 220. Each color filter 230 may display one of primary colors such as three primary colors of red, green, and blue.

Each pixel PX of the liquid crystal display according to an exemplary embodiment of the present invention may include a color filter region CF where the color filter 230 is formed and a non-color filter region OP. In detail, the transmission region of each pixel PX or the opening region of the light blocking member 220 corresponding to each pixel PX may include the color filter region CF and the non-color filter region OP.

In the liquid crystal display according to an exemplary embodiment of the present invention, light incident into the display panel 300 and passing through the color filter region CF may display a color represented by the color filter 230, and light passing through the non-color filter region OP may display white. As described above, if one pixel PX includes the non-color filter region OP where the color filter 230 is not formed and the white light is passed, the transmittance and the luminance of the liquid crystal display may be increased.

In the transmission region of one pixel PX, a ratio of the non-color filter region OP may be less than ½. Also, as shown in FIG. 2, in each pixel PX, two non-color filter regions OP may be positioned at respective sides with respect to one color filter region CF, or two color filter regions CF may be positioned at respective sides with respect to one non-color filter region OP.

At least one of the light blocking member 220 and the color filter 230 may be positioned in the lower panel 100. This will be described with reference to FIG. 4.

An overcoat 250 is formed on the color filter and the light blocking member 220. The overcoat 250 may be made of an insulating material such as an organic insulating material and the overcoat 205 may prevent the color filter 230 from be exposed. The overcoat 250 may level the inner surface of the upper panel 200 according to the formation of the light blocking member 220 and the color filter 230, however, as shown in FIG. 3, a step difference still exists in a boundary portion of the color filter region CF and the non-color filter region OP in the transmission region of each pixel PX. The step difference in the boundary of the color filter region CF and the non-color filter region OP may be several angstroms to several micrometers.

The overcoat 250 is an optional feature and may be omitted.

An opposing electrode 270 for carrying a voltage such as a common voltage Vcom is formed on the overcoat 250. The opposing electrode 270 may be formed as a plate facing a plurality of pixel electrodes 191.

The opposing electrode 270 includes at least one liquid crystal inclination direction determining member in the region corresponding to each pixel PX, and the liquid crystal inclination direction determining member may include cutouts 71, 72, 73, 74a, 74b, 75a, 75b, 76a, and 76b. The liquid crystal inclination direction determining member of the opposing electrode 270 will be described along with the liquid crystal inclination direction determining member of the pixel electrode 191 of the lower panel 100.

An alignment layer 21 may be coated on the opposing electrode 270, and the alignment layer 21 may be a vertical alignment layer.

Next, referring to the liquid crystal layer 3, the liquid crystal layer 3 interposed between the lower panel 100 and the upper panel 200 includes liquid crystal molecules 31 having dielectric anisotropy. The liquid crystal molecules 31 are aligned such that a long axis thereof may be rearranged to be vertical to the surface of two display panels 100 and 200 in the absence of the electric field. The dielectric anisotropy of the liquid crystal layer 3 may be negative dielectric anisotropy.

Next, referring to FIG. 2 and FIG. 3, the lower panel 100 will be described.

A plurality of gate conductors including a plurality of gate lines 121 are formed on an insulation substrate 110.

The gate lines 121 extending in a mainly transverse direction transmit gate signals. The gate lines 121 may each include a gate electrode 124 protruded in an extending direction.

A gate insulating layer 140 is formed on the gate conductor.

A plurality of semiconductors 154 that may be made of amorphous silicon, crystalline silicon, or an oxide semiconductor are formed on the gate insulating layer 140. The semiconductors may extend in the mainly longitudinal direction and may include a protrusion extending toward the gate electrode 124.

Ohmic contacts 163 and 165 may be further formed on the semiconductor 154. The ohmic contacts 163 and 165 include two portions facing each other with respect to the gate electrode 124. The ohmic contacts 163 and 165 are preferably made of n+ hydrogenated a-Si heavily doped with an N-type impurity such as phosphorous, or they may be made of a silicide.

A data conductor including a plurality of data lines 171 and a plurality of drain electrodes 175 is formed on the ohmic contacts 163 and 165 and the gate insulating layer 140.

The data lines 171 transmitting a data signal extend in a longitudinal direction thereby intersecting the gate lines 121. Each data line 171 may include a source electrode 173 extending toward the gate electrode 124.

The plurality of drain electrodes 175 includes an end portion facing the source electrode 173 and an opposite end portion may have a relatively wide area.

A gate electrode 124, a source electrode 173, and the plurality of drain electrodes 175 form a thin film transistor (TFT) Q along with the semiconductor 154, and a channel of the thin film transistor is formed in each semiconductor 154 between the source electrode 173 and the drain electrode 175.

A passivation layer 180 made of an inorganic insulator such as silicon nitride, silicon oxide, or an organic insulator is formed on the data conductor and the exposed semiconductor 154. The passivation layer 180 includes a contact hole 185 exposing a portion of the drain electrode 175.

A plurality of pixel electrodes 191 made of a transparent conductive material such as ITO (indium tin oxide) or IZO (indium zinc oxide) or a reflective metal such as aluminum, silver, chromium, or alloys thereof are formed on the passivation layer 180.

The pixel electrode 191 positioned in one pixel PX may have a rectangular shape having a longer length in a horizontal direction than the length in a vertical direction, but the pixel electrode 191 is not limited to this particular configuration.

Each pixel electrode 191 includes at least one liquid crystal inclination direction determining member, and the liquid crystal inclination direction determining member may include cutouts 91, 92, 93, 94a, 94b, 95a, 95b, 96a, 96b, 97a, and 97b.

The cutouts 71, 72, 73, 74a, 74b, 75a, 75b, 76a, and 76b of the opposing electrode 270 and the cutouts 91, 92, 93, 94a, 94b, 95a, 95b, 96a, 96b, 97a, and 97b of the pixel electrode 191 may be replaced with protrusions or depressions. Next, in an exemplary embodiment of the present invention, as the liquid crystal inclination direction determining member, an example of the cutouts 71, 72, 73, 74a, 74b, 75a, 75b, 76a, 76b, 91, 92, 93, 94a, 94b, 95a, 95b, 96a, 96b, 97a, and 97b is described.

Referring to FIG. 2, the cutouts 71, 72, 73, 74a, 74b, 75a, 75b, 76a, and 76b of the opposing electrode 270 and the cutouts 91, 92, 93, 94a, 94b, 95a, 95b, 96a, 96b, 97a, and 97b of the pixel electrode 191 include at least one oblique portion forming an oblique angle by the extending direction of the gate line 121. Each oblique portion includes a pair of oblique edges facing each other.

In an exemplary embodiment of the present invention, the extending direction of the oblique edge of the cutouts 71-76b and 91-97b in the color filter region CF is different from the extending direction of the cutouts 71-76b and 91-97b in the non-color filter region OP.

In detail, the cutouts 71, 72, 73, 74a, 74b, 75a, 75b, 76a, and 76b of the opposing electrode 270 and the cutouts 91, 92, 93, 94a, 94b, 95a, 95b, 96a, 96b, 97a, and 97b of the pixel electrode 191 may be alternately disposed.

The cutout 91 may include a triangular portion positioned at a lower edge or an upper edge of the pixel electrode 191 and may include a pair of oblique edges and a bar-type portion connected to an apex of the triangular portion.

The cutouts 92 and 93 and the cutouts 71, 72, and 73 may respectively include at least a pair of oblique portions and a bar portion 83 connected to a position where the oblique portions meet to each other. In FIG. 2, the cutout 73 does not include the bar portion, however it may include the bar portion according to a design condition. The bar portion 83 of the cutouts 71, 72, 73, 91, 92, and 93 may extend in the longitudinal direction. The bar portion 83 of the cutouts 71, 72, 73, 91, 92, and 93 may be aligned on a longitudinal center line of the pixel electrode 191.

The cutouts 71, 72, 73, 91, 92, and 93 may symmetrical with respect to the longitudinal center line of the pixel electrode 191.

The cutouts 94a, 94b, 95a, 95b, 96a, and 96b and the cutouts 74a, 74b, 75a, and 75b may respectively include at least a pair of oblique portions and the bar portion 83 connected to a position where the oblique portions meet. In FIG. 2, the cutouts 94a and 94b do not include the bar portion, however they may include the bar portion according to a design condition. The bar portion 83 of the cutouts 74a, 74b, 75a, 75b, 94a, 94b, 95a, 95b, 96a, and 96b may extend in the vertical direction. Also, the bar portion 83 of the cutouts 74a, 74b, 75a, 75b, 94a, 94b, 95a, 95b, 96a, and 96b may be aligned on the boundary line between the color filter region CF and the non-color filter region OP.

The cutouts 74a, 74b, 75a, 75b, 94a, 94b, 95a, 95b, 96a, and 96b may be symmetrical with respect to the boundary line between the color filter region CF and the non-color filter region OP.

The opposing electrode 270 or the pixel electrode 191 may further include the cutouts 76a, 76b, 97a, and 97b may be positioned in the non-color filter region OP according to the shape of the pixel PX. The cutouts 76a, 76b, 97a, and 97b positioned in the non-color filter region OP may respectively include one oblique portion and each oblique portion may include a pair of oblique edges facing each other.

The cutouts 71-76b of the opposing electrode 270 may further include an end extending in the vertical direction or the horizontal direction from the end of each oblique portion. The end may overlap and extend according to the edge of the pixel electrode 191.

Also, the oblique edge of the cutouts 91-97b of the pixel electrode 191 and the cutouts 71-76b of the opposing electrode 270 may include notches 81 and 82. The notches 81 and 82 may include an engraved notch 81 formed into the inside of the cutouts 71-76b and 91-97b and an embossed notch 82 formed into the outside. The notches 81 and 82 may prevent an afterimage or a spot by uniformly forming a generation position of a singular point where the arrangement direction of the liquid crystal molecules 31 is different from the arrangement direction of the liquid crystal molecules 31 of a circumference and is quickly changed. The arrangement direction of the liquid crystal molecules may be arbitrary.

The engraved notch 81 and the embossed notch 82 that are positioned at one oblique portion of the cutouts 71-76b and 91-97b may be alternately disposed. Also, a diverging point where the bar portion 83 of the cutouts 71-76b and 91-97b is positioned or a pair of oblique portions meet each other may substantially have a function of the embossed notch 82 such that the notch directly neighboring the bar portion 83 or the diverging point may be the engraved notch 81.

The oblique edge of the oblique portion of the cutouts 71-76b and 91-97b may form an angle of about 45 degrees with the gate line 121.

One of the pixel electrodes 191 and the opposing electrode 270 may not have the cutout of the liquid crystal inclination direction determining member.

If the voltages are applied to the opposing electrode 270 and the pixel electrode 191, a main electric field is generated to the liquid crystal layer 3 according to a potential difference thereof, and the cutouts 91-97b of the pixel electrode 191 and the cutouts 71-76b of the opposing electrode 270 distort the main electric field, thereby forming a horizontal component by a fringe field of the electric field. The liquid crystal molecules 31 having the negative dielectric anisotropy are inclined in a direction determined by the horizontal component of the electric field. Accordingly, one pixel PX may have a plurality of domains having different directions to which the liquid crystal molecules 31 are inclined by the cutouts 71-76b and 91-97b extending in the different directions.

In the exemplary embodiment shown in FIG. 2, the inclination of the liquid crystal molecules 31 is in approximately four directions. As the inclination directions of the liquid crystal molecules 31 are diversified, the viewing angle of the liquid crystal display becomes widened.

Also, the extending direction of the oblique edge of the oblique portion of the cutouts 71-76b and 91-97b is different with reference to the boundary line of the color filter region CF and the non-color filter region OP, such that the inclination direction of the liquid crystal molecules 31 is also different with reference to the boundary line of the color filter region CF and the non-color filter region OP.

Referring to FIG. 5, two oblique portions of a representative cutout 90 of the several cutouts 71-76b and 91-97b positioned at the boundary of the color filter region CF and the non-color filter region OP have the different extending directions with reference to the boundary of the color filter region CF and the non-color filter region OP. Accordingly, the inclination directions D1 and D2 of the liquid crystal molecules 31 that are inclined according to the horizontal component of the friend field of the cutout 90 are different.

A step difference corresponding to the thickness of the color filter 230 or difference of the cell gap of the liquid crystal layer 3 exists in the boundary between of the color filter region CF and the non-color filter region OP, and the liquid crystal molecules 31 may disarranged and a texture may be generated in the boundary where the step difference of the display panels 100 and 200 or the difference of the cell gap of the liquid crystal layer 3 occurs. However, the liquid crystal inclination direction may be controlled to be different relative to the boundary where the step difference exists in the transmission region of one pixel PX by differentiating the directions of the liquid crystal inclination direction determining member, for example, the cutouts 71-76b and 91-97b, with reference to the boundary, thereby reducing the texture in the step region.

For example, two domains exist where the inclination directions of the liquid crystal molecules of the pixel PX are divided with reference to the boundary where the step difference exists in the inner surface of the lower panel 100 or the upper panel 200. The difference of the cell gap of the liquid crystal layer 3 is generated such that the texture may be reduced in the boundary region where the step difference exists or the difference of the cell gap is generated and the transmittance may be increased.

In the transmission region of one pixel PX according to an exemplary embodiment of the present invention, the step difference of the display panels 100 and 200 is generated or the difference of the cell gap of the liquid crystal layer 3 is generated in the boundary of the region where the color filter 230 exists and the region where the color filter 230 does not exist. However, the transmission region of the one pixel PX is not limited to this particular arrangement, and the step difference of the display panels 100 and 200 may be generated or the difference of the cell gap of the liquid crystal layer 3 may be generated by other factors. As described above, the texture may be reduced by dividing the domains of the pixel PX in the boundary region of two regions where the cell gap of the liquid crystal layer 3 is different in the transmission region of one pixel PX.

Again referring to FIG. 2 and FIG. 3, the pixel electrode 191 receives the data voltage from the drain electrode 175 through the contact hole 185.

An alignment layer 11 may be coated on the pixel electrode 191, and the alignment layer 11 may be a vertical alignment layer.

The pixel electrode 191 and the opposing electrode 270 form the liquid crystal capacitor along with the liquid crystal layer 3 interposed therebetween, and a difference between the data voltage applied to the pixel electrode and the common voltage applied to the opposing electrode is represented as a charge voltage of the liquid crystal capacitor, i.e., a pixel voltage. Each pixel PX displays a luminance according to the pixel voltage.

Referring to FIG. 4, the liquid crystal display according to an exemplary embodiment of the present invention may be substantially similar to the exemplary embodiment shown in FIG. 2 and FIG. 3, however the color filter 230 and the light blocking member 220 positioned in the upper panel 200 may be positioned in the lower panel 100. Accordingly, the arrangement of FIG. 4 may be descried herein in terms of differences from the arrangement described above with respect to FIGS. 2 and 3.

A lower passivation layer 180p made of the inorganic insulator such as silicon nitride or silicon oxide or the organic insulator is formed on the data conductor and the exposed portion of the semiconductor 154. The light blocking member 220 and the color filter 230 are positioned on the lower passivation layer 180p. The color filter 230 may include an opening on the drain electrode 175. The lower passivation layer 180p may prevent the pigments of the color filters 230 from flowing into the exposed semiconductor 154.

An upper passivation layer 180q is formed on the light blocking member 220 and the color filter 230. The upper passivation layer 180q may be made of an inorganic insulating material such as silicon nitride or silicon oxide. The upper passivation layer 180q prevents the color filters 230 from lifting and suppresses the contamination of the liquid crystal layer 3 by the organic material such as a solvent flowing from the color filters 230. Accordingly, defects such as an afterimage that may be generated during driving may be reduced or prevented.

The upper passivation layer 180q and the lower passivation layer 180p have a contact hole 185 exposing the drain electrode 175. The contact hole 185 may be positioned in the opening of the color filter 230.

A pixel electrode 191 is formed on the upper passivation layer 180q.

As described above, when the light blocking member 220 and the color filter 230 are positioned in the lower panel 100, a large step difference exists in the boundary of the color filter region CF and the non-color filter region OP, and a substantial difference in the cell gap of the liquid crystal layer 3 may be generated. Accordingly, a texture artifact may be reduced by dividing the boundary region into the domain of the pixel PX like described above.

Figure 6:
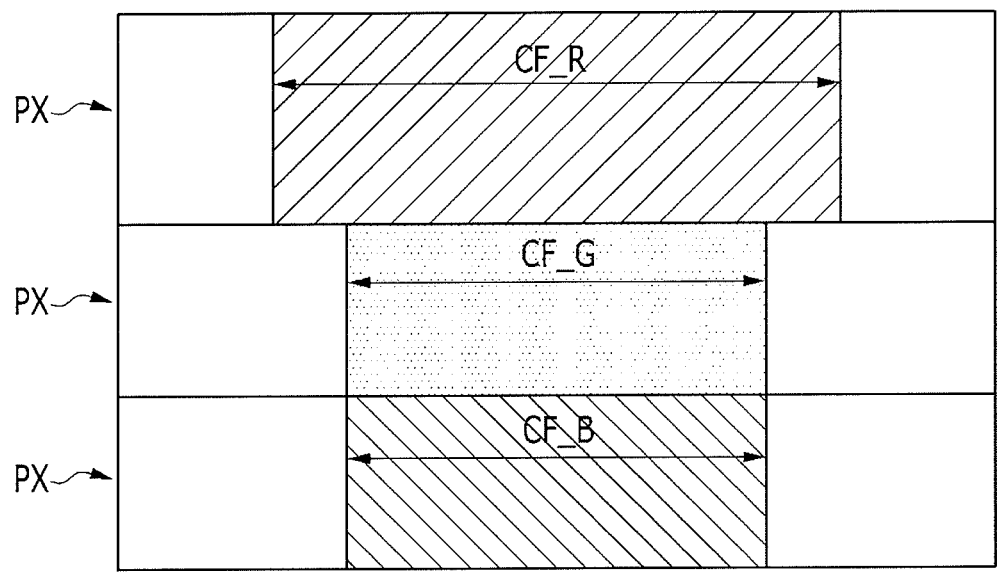
FIG. 6 is a layout view of three neighboring pixels of a liquid crystal display according to an exemplary embodiment of the present invention.

FIG. 6 is a layout view of three neighboring pixels of a liquid crystal display according to an exemplary embodiment of the present invention.

Referring to FIG. 6, when the liquid crystal display according to an exemplary embodiment of the present invention includes the pixel PX representing red, green, and blue, a red pixel PX, a green pixel PX, and a blue pixel PX may be alternately arranged.

At least one area or a horizontal direction width among a red color filter region CF_R (the region occupied by the color filter 230 in the red pixel PX), a green color filter region CF_G (the region occupied by the color filter 230 in the green pixel PX), and a blue color filter region CF_B (the region occupied by the color filter 230 in the blue pixel PX) may be different from the rest. For example, as shown in FIG. 6, the area of the red color filter region CF_R may be larger than the area of the green color filter region CF_G or the blue color filter region CF_B. As described above, the transmittance may be increased while increasing the color impression by controlling the area of the color filter region CF of the pixel PX representing the different color.

Differently from the exemplary embodiment discussed above with respect to FIG. 6, the color impression may be controlled and the color reproducibility may be increased by differentiating the thickness of the color filter 230 positioned in each pixel PX.

One pixel PX of a liquid crystal display according to an exemplary embodiment of the present invention will be described with reference to FIG. 7. The same constituent elements as in the previous exemplary embodiment may be indicated by the same reference numerals and the same description may be omitted.

Figure 7:
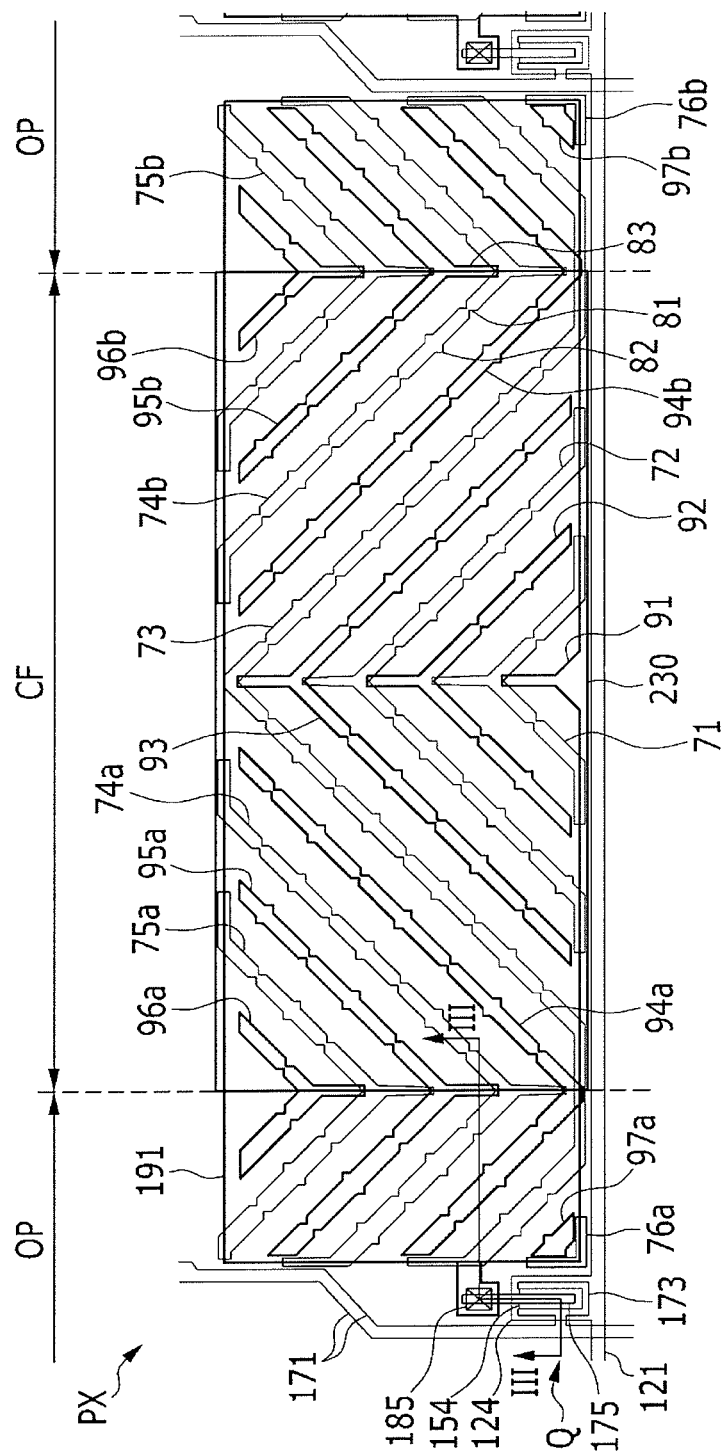
FIG. 7 is a layout view of one pixel of a liquid crystal display according to an exemplary embodiment of the present invention.

FIG. 7 is a layout view of one pixel of a liquid crystal display according to an exemplary embodiment of the present invention.

The liquid crystal display may be substantially similar to the liquid crystal displays discussed above with respect to FIG. 2 to FIG. 5; however the width of the cutouts 73-76b and 94a-97b in the non-color filter region OP may be wider than the width of the cutouts 71-72 and 91-93 in the color filter region CF.

The cell gap of the liquid crystal layer 3 in the non-color filter region OP is greater than the cell gap of the liquid crystal layer 3 in the color filter region CF such that the fringe field between the cutouts 91-97b of the pixel electrode 191 and the cutouts 71-76b of the opposing electrode 270 may be further smaller in the non-color filter region OP. However, if the width of the cutouts 73-76b and 94a-97b in the non-color filter region OP is larger than the width of the cutouts 71-72 and 91-93 in the color filter region CF, the horizontal component of the fringe field may be increased such that the inclination direction of the liquid crystal molecules 31 may be further easily and quickly determined.

Next, referring to FIG. 8, one pixel PX of a liquid crystal display according to an exemplary embodiment of the present invention will be described. The same constituent elements as in the previous exemplary embodiment may be indicated by the same reference numerals and the same description may be omitted.

Figure 8:
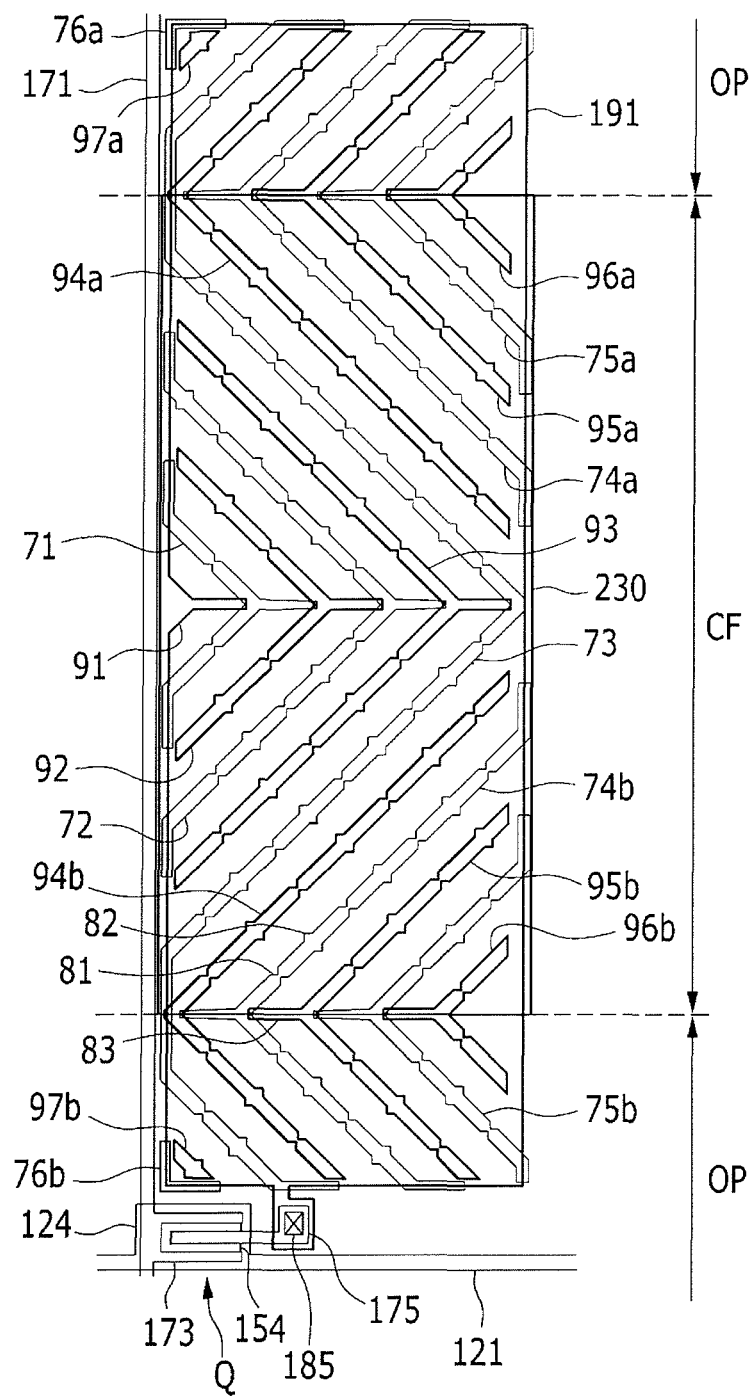
FIG. 8 is a layout view of one pixel of a liquid crystal display according to an exemplary embodiment of the present invention.

FIG. 8 is a layout view of one pixel of a liquid crystal display according to an exemplary embodiment of the present invention.

The liquid crystal display according may be substantially similar to the LCDs discussed above with respect to FIG. 2 to FIG. 5; however a vertical direction length of the pixel PX or the pixel electrode 191 may be longer than the horizontal direction length thereof.

In detail, the shape of the pixel electrode 191 may be substantially similar to the shape as the pixel electrode 191 shown in FIG. 2 but may be rotated in a clockwise direction or a counterclockwise direction by 90 degrees. Also, at least one color filter region CF and at least one non-color filter region OP in one pixel PX may neighbor in the longitudinal direction. Also, the bar portion 83 of the cutouts 71-76b and 91-97b of the pixel electrode 191 and opposing electrode 270 may extend in the horizontal direction.

The gate line 121 may also extend in the transverse direction and the data line 171 may also extend in the longitudinal direction thereby intersecting the gate line 121.

The features and aspects shown and described with respect to one figure may be incorporated into the structure shown and described with respect to other figures.

According to exemplary embodiments of the present invention, the pixel electrode 191 and the opposing electrode 270 may be positioned in the different display panels 100 and 200; however the invention is not limited to this particular configuration, and the pixel electrode 191 and the opposing electrode 270 may be positioned in the same display panels of 100 and 200.

Also, the cutouts 71-76b and 91-97b may be applied as the liquid crystal inclination direction determining members of the pixel electrode 191 and the opposing electrode 270; however the invention is not limited to this particular configuration, and the liquid crystal inclination direction determining members may be formed of various structures and materials.

While exemplary embodiments of the present invention have been described with reference to the figures, it is to be understood that the invention is not limited to the disclosed embodiments, but, on the contrary, is intended to cover various modifications and equivalent arrangements.

What is claimed is:

1. A display panel for a liquid crystal display, comprising:
a plurality of pixels;
a first substrate and a second substrate opposing each other;
a liquid crystal layer positioned between the first substrate and the second substrate;
a pixel electrode positioned on the first substrate and positioned in one pixel of the plurality of pixels; and
an opposing electrode facing the pixel electrode with the liquid crystal layer interposed between the pixel electrode and the opposing electrode,
wherein at least one of the pixel electrode and the opposing electrode includes a liquid crystal inclination direction determining member,
a transmission region of the one pixel includes a first region with a first average cell gap and a second region with a second average cell gap, wherein the first and second average cell gaps have different sizes in a cross-sectional view of the display panel, and
wherein a cell gap of the liquid crystal layer changes to form a step difference in the cross-sectional view at a boundary between the first region and the second region, and the extension direction of the liquid crystal determining member changes at the boundary between the first region and the second region in a plane view of the display panel, and
the first average cell gap over the first region is larger than the second average cell gap over the second region.

2. The display panel of claim 1, wherein a width of the liquid crystal inclination direction determining member in the first region of the one pixel is larger than a width of the liquid crystal inclination direction determining member in the second region of the one pixel.

3. The display panel of claim 2, further comprising a gate line positioned on the first substrate, and the liquid crystal inclination direction determining member includes an oblique portion forming an oblique angle with the gate line.

4. The display panel of claim 3, wherein the liquid crystal inclination direction determining member is substantially symmetric with respect to the boundary between the first region of the one pixel and the second region of the one pixel.

5. The display panel of claim 4, wherein the liquid crystal inclination direction determining member further includes a bar portion extending along the boundary between the first region of the one pixel and the second region of the one pixel.

6. The display panel of claim 5, wherein the liquid crystal inclination direction determining member comprises a cutout.

7. The display panel of claim 6, wherein an engraved notch and an embossed notch are alternately disposed in an oblique portion of the cutout.

8. The display panel of claim 7, wherein the engraved notch neighbors the bar portion.

9. The display panel of claim 8, further comprising a color filter positioned in the second region of the one pixel, and the color filter is not present in the first region of the one pixel.

10. The display panel of claim 1, further comprising a gate line positioned on the first substrate, and wherein the liquid crystal inclination direction determining member includes an oblique portion forming an oblique angle with the gate line.

11. The display panel of claim 10, wherein the liquid crystal inclination direction determining member is substantially symmetric with respect to a boundary between the first region of the one pixel and the second region of the one pixel.

12. The display panel of claim 11, wherein the liquid crystal inclination direction determining member further includes a bar portion extending along the boundary between the first region of the one pixel and the second region of the one pixel.

13. The display panel of claim 12, wherein the liquid crystal inclination direction determining member comprises a cutout.

14. The display panel of claim 13, wherein: the first cell gap is larger than the second cell gap, a color filter is positioned in the second region of the one pixel, and the color filter is not present in the first region of the one pixel.

15. The display panel of claim 1, wherein the liquid crystal inclination direction determining member further includes a bar portion extending along a boundary between the first region of the one pixel and the second region of the one pixel.

16. The display panel of claim 15, wherein the liquid crystal inclination direction determining member comprises a cutout.

17. The display panel of claim 16, wherein an engraved notch and an embossed notch are alternately disposed in an oblique portion of the cutout.

18. The display panel of claim 17, wherein the first cell gap is larger than the second cell gap, a color filter is positioned on the second region of the one, and the color filter is not present in the first region of the one pixel.

19. The display panel of claim 1, wherein the liquid crystal inclination direction determining member comprises a cutout.

20. The display panel of claim 1, wherein the first cell gap is larger than the second cell gap, a color filter is positioned in the second region of the one pixel, and the color filter is not present in the first region.

21. A liquid crystal display panel, comprising: a first substrate including a pixel electrode; a second substrate including an opposing electrode; a plurality of pixels formed in the pixel electrode; a liquid crystal layer positioned between the pixel electrode and the opposing electrode; and a liquid crystal inclination direction determining member positioned on either the first or second substrate, wherein a transmission region of each of the plurality of pixels includes a first average region with a first cell gap and a second average region with a second cell gap, wherein the first and second average cell gaps have different sizes in a cross-sectional view of the display panel, and wherein a cell gap of the liquid crystal layer changes to form a step difference in the cross-sectional view at a boundary between the first region and the second region, and the extension direction of the liquid crystal determining member changes at the boundary between the first region and the second region in a plane view of the display panel, and
the first average cell gap over the first region is larger than the second average cell gap over the second region.

* * * * *